US006499858B2

(12) United States Patent
Hart

(10) Patent No.: US 6,499,858 B2
(45) Date of Patent: Dec. 31, 2002

(54) ILLUMINATION DEVICE FOR SAFETY MARKERS

(76) Inventor: David Alan Hart, 4229 Bordeaux, Dallas, TX (US) 75205

( * ) Notice: Subject to any disclaimer, the term of this patent is extended or adjusted under 35 U.S.C. 154(b) by 0 days.

(21) Appl. No.: 09/842,885

(22) Filed: Apr. 27, 2001

(65) Prior Publication Data

US 2002/0159251 A1 Oct. 31, 2002

(51) Int. Cl.[7] ............................ F21V 33/00; B60Q 7/00
(52) U.S. Cl. ........................ 362/183; 362/253; 362/190; 362/191; 116/63 C; 340/908
(58) Field of Search ........................ 116/63 C; 362/253, 362/190, 191, 183; 340/908

(56) References Cited

U.S. PATENT DOCUMENTS 4,292,627 A * 9/1981 Knight ..................... 116/63 C
5,754,124 A * 5/1998 Daggett ...................... 362/183
5,755,174 A * 5/1998 Freeman ................... 116/63 C
5,918,964 A * 7/1999 Bou ........................... 362/186
6,200,000 B1 * 3/2001 Burnidge .................... 362/155

* cited by examiner

Primary Examiner—Thomas M. Sember
(74) Attorney, Agent, or Firm—J. Kevin Gray

(57) ABSTRACT

An illumination device for use with a safety marker to increase the visibility of said safety marker is described. The illumination device includes a generally circular and hollow bracket supporting an illumination source (e.g., bulb) and having at least one flange associated therewith. The flange of the bracket is shaped and positioned to removably fit between at least two protruding feet of a traditional safety marker without inhibiting the desired nesting or stacking feature of the safety marker. The illumination source may be powered by a variety of power sources (e.g., solar panel) and, when attached to the safety marker, provides illumination of the exterior surfaces of the body of the safety marker, thereby greatly increasing the visibility of the safety marker.

19 Claims, 5 Drawing Sheets

ILLUMINATION DEVICE FOR SAFETY MARKERS

BACKGROUND OF THE INVENTION

1. Technical Field of the Invention

The present invention relates to safety or traffic markers and, in particular, to a device used with a safety or traffic marker to increase visibility of said marker.

2. Description of Related Art

Safety or traffic marks are devices used to physically mark the location of safety hazards (e.g., a road-side hazard) so that individuals exposed to such hazards will take particular notice of it and, hopefully, be able to avoid the hazard. Traditional safety markers primarily include traffic cones, relatively simple integral members comprising a rectangular base and a conical body. Such markers are generally constructed of a generally translucent, brightly colored and often reflective material, such as plastic. FIG. 1 illustrates a traditional form of a traffic cone 10 having a generally conical body 20.

Safety markers are routinely used around locations where construction or some other obstruction is present on or close to roads or vehicle byways. Since those primarily using a road or byway are presumably focused on the operation of the vehicle in which such user is traveling, a device is needed to draw the attention of such users to extraordinary situations present along or adjacent to the road or byway. For example, where construction is taking place on a portion of the road itself, safety markers are often used in close connection with each other to outline the area subject to such construction, simultaneously: (a) forming a partition to separate the users of the road from the construction project and its associated workers and equipment; and (b) calling increased attention to the presence of the potential hazard. Bright (and sometime reflective colors) of the safety markers allow users of the road to notice, and take heed of, the associated hazard even in dim or low light situations (e.g., at night or during inclement weather).

Despite some incremental improvements in traditional safety markers, several distinct disadvantages are still associated with such markers. For example, even for markers having brightly colored or reflective surfaces, safety markers are often difficult to properly visualize in routine situations. For example, at night such markers are often not noticed until a point when the user of the road or byway has too little time to react to the associated hazard. Inclement weather situations (e.g., snow, heavy rain, fog) can also produce this result. Additionally, it can be argued that the rather ubiquitous nature of traditional safety markers has conditioned those who would be warned of associated hazards to pay less attention to such traditional markers.

As a result of the foregoing limitations associated with traditional safety markers, attempts have been made to improve the visibility of such markers. For example, flashing warning lights have been used with limited success in connection with safety markers. Such flashing lights are typically removably attached to the upper surface of a traffic marker in an effort to increase the visibility of said marker. However, the bulky nature and often complex way in which the flashing light must be attached, powered, maintained, etc., render such lights impractical, if not impossible, to use with typical safety markers.

An example of such a device is found in U.S. Pat. No. 5,577,824 to Wright, entitled Traffic Cone-Mounted Warning Lights. Although the concept of providing a flashing light to increase the visibility of a safety marker is laudable, the Wright device proves to be impractical, at best, when used with a traditional traffic cone. For example, since the flashing light device of the Wright invention is slipped down over the exterior, upper portion of the traffic cone, the presence of the device adds weight and bulk to the upper portion of the cone, destabilizing it. With device in place, the marker more easily tips over when the marker is subjected to certain destabilizing forces, such as wind.

An additional limitation to devices such as the Wright invention is that the presence of the device precludes the desirable, and therefore, preferred manner of collecting, transporting, storing and distributing traditional traffic markers—stacking or nesting of the conical markers. Indeed, the addition of virtually any object to the exterior surface of traditional traffic markers will impede the desirable stacking feature of the conical shape of the markers.

As a last example, the presence of any object (such as the Wright invention) on the exterior surface of a safety marker facilitates an opportunity for mischief. Since the device is exterior to the marker, it is extremely convenient for unauthorized individuals to tamper with, damage or even quickly remove, the device, thus altering or preventing its desirable function.

SUMMARY OF THE INVENTION

The present invention comprises a device capable of increasing the visibility (and therefore the desired function) of a traditional safety marker. The present invention accomplishes greater visibility of the marker, through the use of an integral source of illumination capable of illuminating the entire visible surface of the marker, without hindering the desirable features associated with said markers.

More specifically, the present invention further comprises a bracket shaped to detachably mate with an interior surface of a safety marker. In a preferred embodiment, the bracket mates with an interior surface of a safety marker such that: (a) it does not inhibit the nesting feature of the shape of the marker; and (b) the illumination device is protected from the elements and from convenient interference by unauthorized individuals.

Associated with the bracket is a source of illumination, such as a bulb. The bulb is preferably removably attached to the bracket such that it easily can be removed and discarded, when replacement is needed or otherwise desired. The bulb may be powered by one or more of several means, including a traditional battery or power source, or a solar panel pack. When illuminated, the bulb provides enough light to illuminate from within the marker the visible exterior surfaces of the marker, thereby greatly increasing the visibility of the marker to those to be warned by the presence of the marker.

BRIEF DESCRIPTION OF THE DRAWINGS

A more complete understanding of the apparatus of the present invention may be acquired by reference to the following Detailed Description when taken in conjunction with the accompanying Drawings wherein.

DETAILED DESCRIPTION OF THE PRESENTLY PREFERRED EXEMPLARY EMBODIMENTS OF THE PRESENT INVENTION

Figure 1:
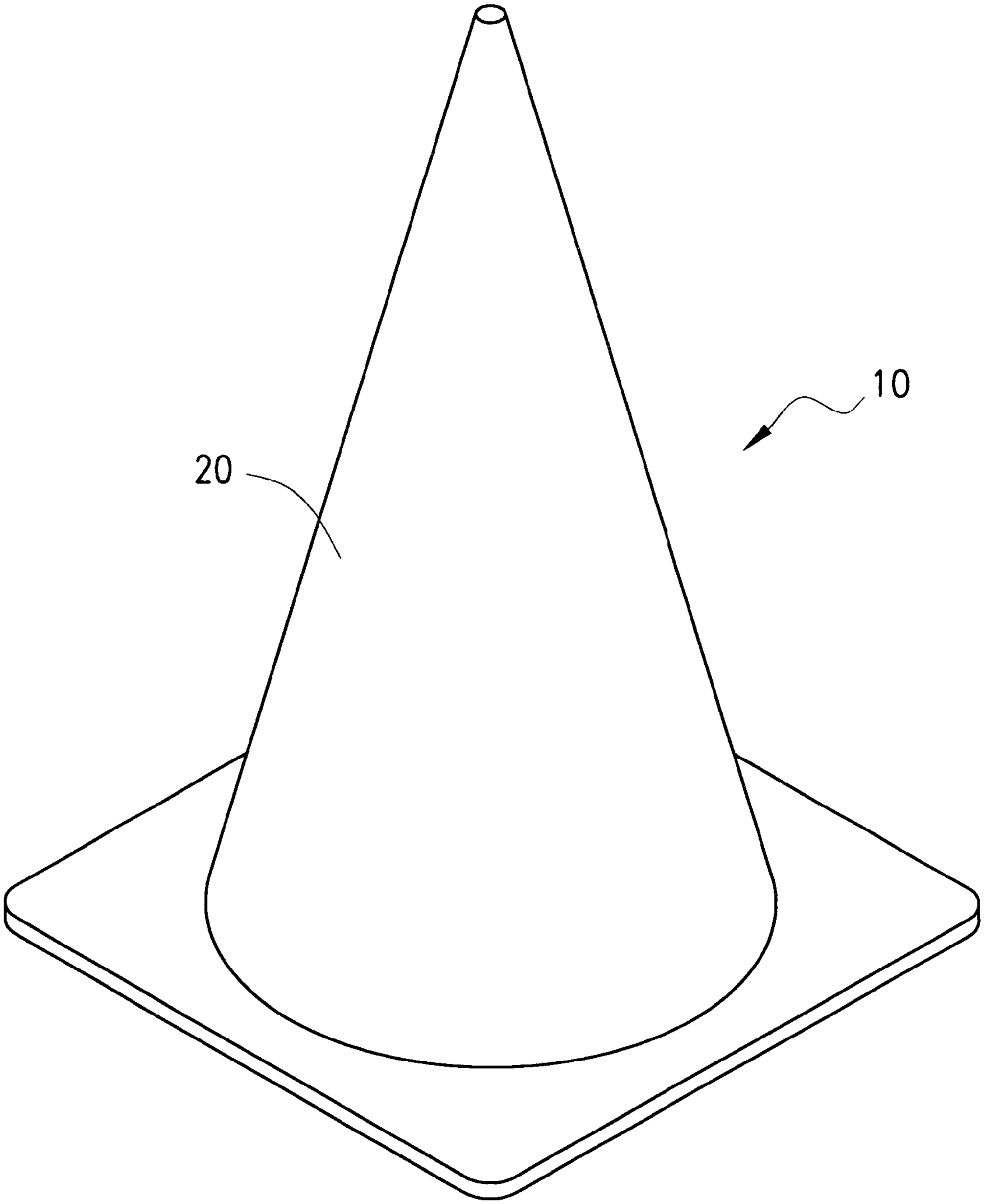
FIG. 1 is a side view of a traditional safety marker, a conical traffic cone.
Figure 2:
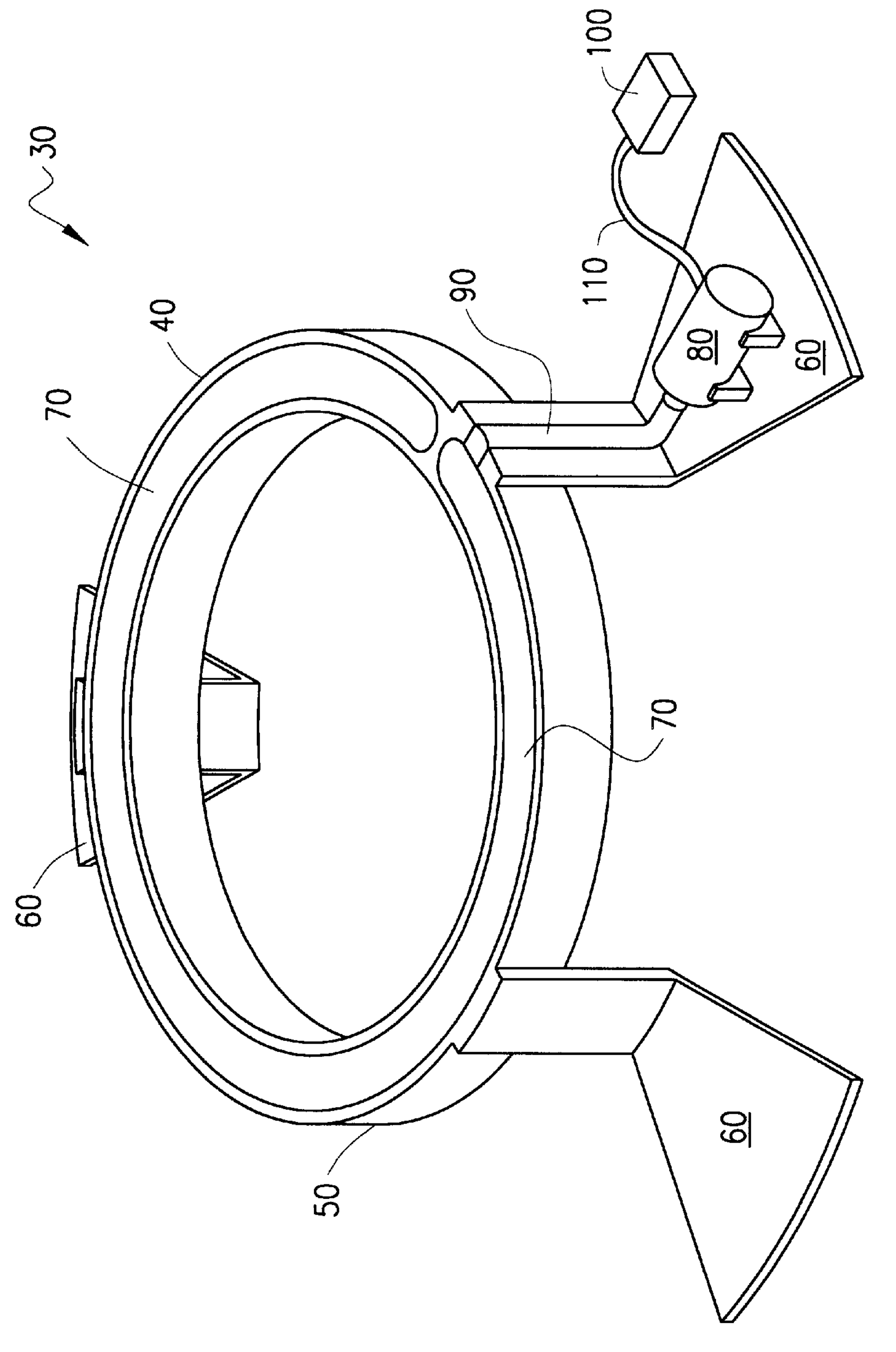
FIG. 2 is a perspective view of an embodiment of the present invention.

Reference is now made to FIG. 2 wherein there is shown a perspective view of an embodiment of the present invention illumination device 30. The illumination device 30 includes a bracket 40 shaped to mate with an interior surface of a safety marker (not shown). In this embodiment of the illumination device 30, the bracket 40 preferably comprises a unitary structure having a ring 50 that is generally circular and hollow, and one or more elongated flanges 60. The relative placement of the flanges 60 allows the bracket 40 to detachably mate with an interior surface of a safety marker (not shown).

The bracket 40 is preferably composed of a lightweight, durable material, such as aluminum or other light metal, so that the bracket 40 provides structural integrity for the illumination device 30, but does not add an appreciable amount of weight to the safety marker with which the illumination device 30 is used. Although aluminum or other light metals are described herein, it is noted that the bracket made be made from any suitable material, including, without limitation, plastics, resins and the like.

Associated with the ring 50 of the bracket 40 is an illumination source 70, such as a bulb. Preferably, the illumination source 70 is associated with substantially the entire upper surface of the ring 50, to provide relatively even illumination from said ring 50. Although a bulb is shown, it is noted that any suitable source for providing illumination is contemplated by the present invention.

Figure 3:
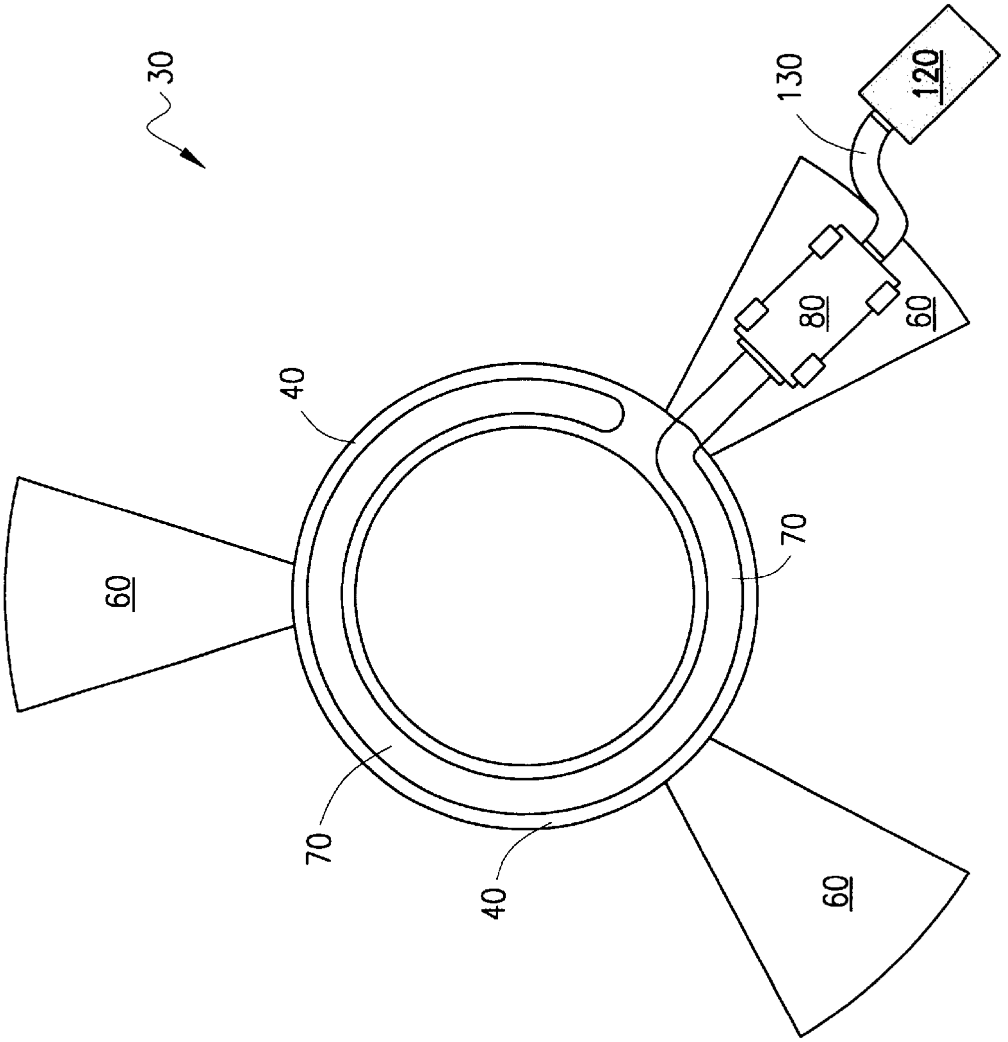
FIG. 3 is a top view of an embodiment of the present invention.

Powering the illumination source 70 is a power source 80. The power source 80 is preferably removably associated with one or more of the flanges 60. The power source 80 may be removably attached to the flanges 60 via any suitable means for attachment, including, without limitation, clips, screws, Velcro® fasteners, or the like. As illustrated in FIG. 3, power from the power source 80 is provided by a battery pack. However, the power source 80 may be powered by any suitable means, including, without limitation, a solar panel (see FIG. 3), chemical cells, and the like.

The power source 80 is electrically associated to the illumination source 70 via a detachable connector 90. Connector 90 may be of any suitable type, including, without limitation, snap or clip connectors.

An alternative feature of the preferred embodiment is a sensor 100 that senses the ambient light conditions associated with the safety marker (not shown) utilizing the illumination device 30. The sensor 100 activates and deactivated the power source 80 via line 110 in response to light conditions, ensuring that the illumination source 70 is "on" when low level light conditions fall below a predetermined level, and "off" when light conditions are above a predetermined level. Although sensor 100 is illustrates as being associated with power source 80 via line 110, it is noted that said sensor 100 can also be associated with power source via a wireless or other suitable connection.

Reference is now made to FIG. 3 wherein there is shown a top view of an embodiment of the illumination device 30 in accordance with the present invention. In this embodiment, one of the flanges 60 of the bracket 40 includes a power source 80 associated with a solar panel 120. The solar panel 120 includes a stem 130 that allows the solar panel 120 to extend away from the traffic marker associated with the illumination device 30 so that the solar panel 120 can collect energy from the sun or other light source to power the illumination device 30.

Figure 4:
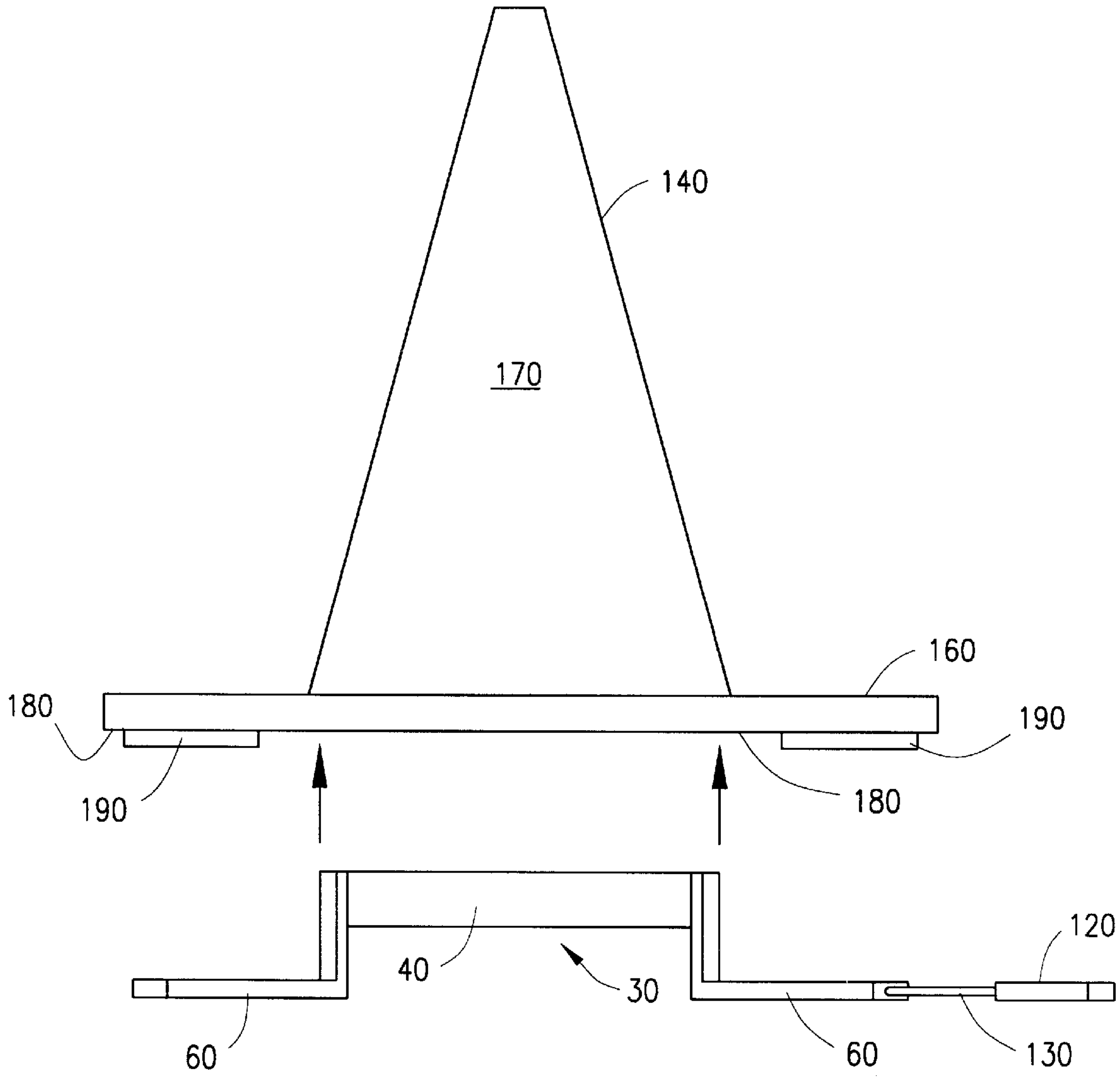
FIG. 4 is a perspective view of an embodiment of the present invention as used in connection with a traditional safety marker.
Figure 5:
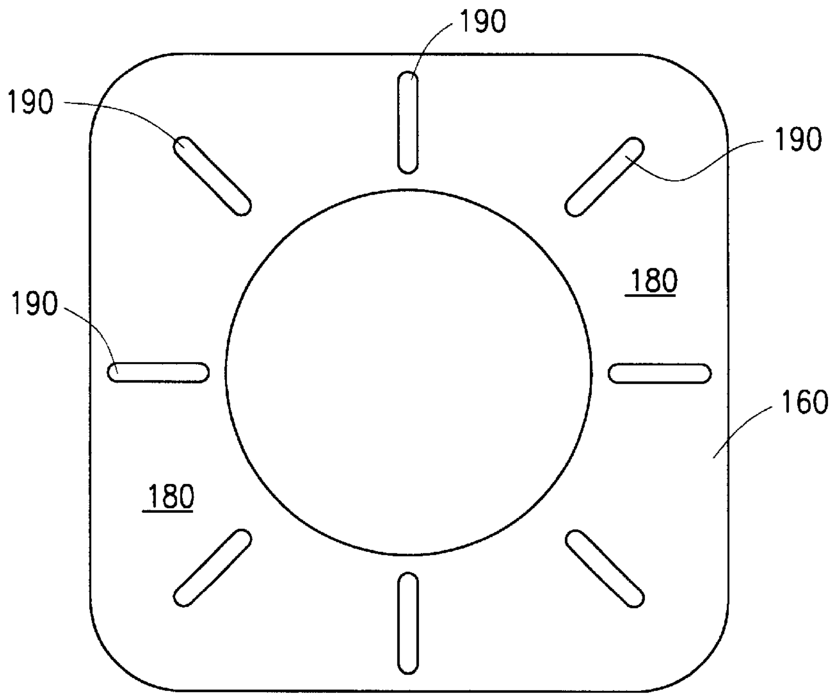
FIG. 5 is a bottom view of traditional safety marker, illustrating the underneath surface of the marker.
Figure 6:
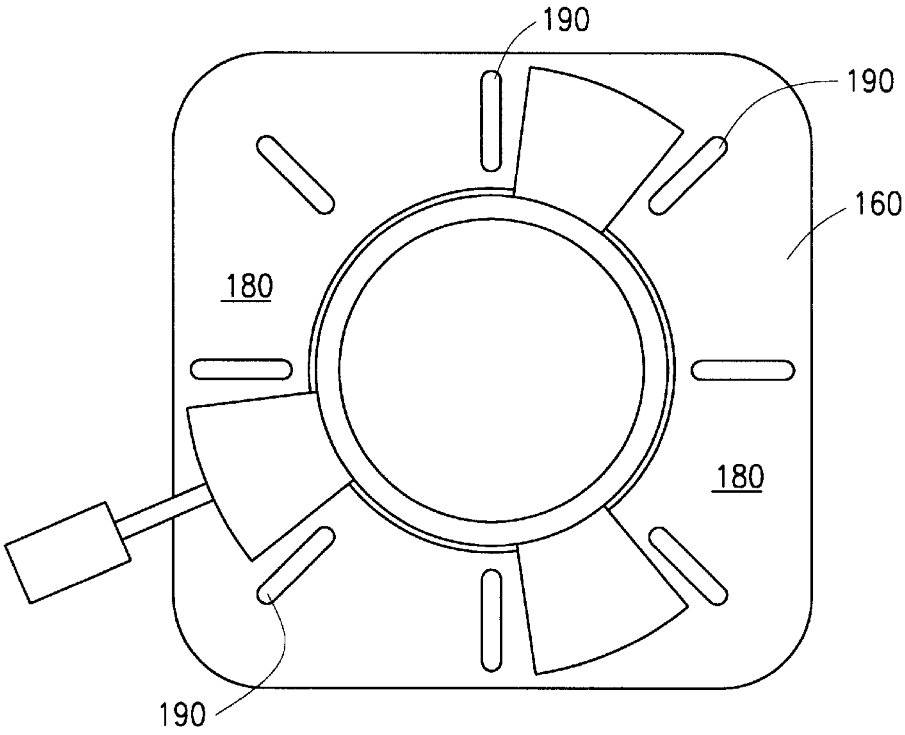
FIG. 6 is bottom view of a traditional safety marker, illustrating use of an embodiment of the present invention with the marker.

With reference to FIGS. 4, 5 & 6, an embodiment of the illumination device 30 of the present invention is illustrated in use in connection with a safety marker 140. As shown in FIG. 4, safety marker 140 is comprised of a generally rectangular base 160 and a conical body 170. As shown in FIGS. 5 & 6, the bottom surface 180 of the base 160 of the safety marker 140 includes one or more integral feet 190 spaced at predetermined intervals. These feet 190 provide the safety marker 140 prevent the entire bottom surface 180 from making contacting with the surface upon which the safety marker 140 is placed (e.g., road). The feet 190 also function to assist with nesting or stacking multiple safety markers 140 in that they keep the nested markers from nesting too tightly, preventing difficult separation of same.

As illustrated in FIGS. 4 & 6, the flanges 60 of the bracket 40 of the illumination device 30 are shaped and spaced to fit between the feet 190 of the safety marker 140 such that the bracket 40 can be detachably snapped, and firmly held, into place underneath and within the bottom surface 180 of the safety marker 140. In place, the ring 50 of the bracket 40 rests slightly above the base of the safety marker 140. In this embodiment, the stem 130 of the solar panel 120 allows the solar panel 120 to extend away from the base 160 of the safety marker 140 so that rays from a light source may be collected. Although the stem 130 of the solar panel 120 is illustrated to allow the solar panel 120 to lie apart from the safety marker 140, it is noted that the present invention contemplates use of the solar panel 120 in close association with, including attached in any suitable manner to, the safety marker 140.

When in place and illuminated, the illumination device 30 provides light up and through the entire conical body 170 of the safety marker 140, greatly increasing the visibility of the safety marker 140 and the hazard or condition associated with same. Importantly, the shape and placement of the illumination device 30 up and within the safety marker 140, and the generally hollow nature of the ring 50, provides the greater visibility described herein, but does not prohibit or otherwise hinder the desirable stacking and nesting features of the safety maker 140. Additionally, rather than potentially destabilizing the safety marker 140 by its presence, the presence of the illumination device 30 of the present invention provides greater stability in that it adds a manageable amount of weight and bulk along the lower portion of the safety marker, lowering the center of gravity for the safety marker 140.

Although preferred embodiments of the apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. An illumination device, comprising, in combination:

a safety marker having a body composed of a generally translucent material, a base and a bottom surface including at least two protruding feet;

a bracket of unitary construction and having a ring;

said bracket including at least one flange shaped to fit between the at least two feet of the safety marker such that the bracket can be removably attached to the bottom surface of the safety marker, and an illumination source associated with said ring of said bracket; said illumination source capable of illuminating the body of said safety marker when said bracket is removably attached to said safety marker.

2. The illumination device of claim 1, wherein the bracket is generally hollow and circular in shape.

3. The illumination device of claim 1, wherein the illumination source is disposed within the ring of the bracket.

4. The illumination device of claim 1, wherein the illumination source is disposed across substantially the entire ring of the bracket.

5. The illumination device of claim 1, wherein the illumination source is a bulb.

6. The illumination device of claim 1, further including a power source for powering the illumination source.

7. The illumination device of claim 6, wherein the power source is removable.

8. The illumination device of claim 6, wherein the power source is a battery.

9. The illumination device of claim 6, wherein the power source is a solar panel.

10. The illumination device of claim 9, wherein the solar panel is connected to the illumination device so that the solar panel is physically separated from the illumination device.

11. The illumination device of claim 6, wherein the power source is a chemical cell.

12. The illumination device of claim 1, wherein the at least one flange of the bracket is located below the surface of the ring such that the ring is elevated with respect to the flange when the illumination device is attached to the safety marker.

13. The illumination device of claim 1, wherein the bracket is composed of a lightweight metal.

14. The illumination device of claim 13, wherein the lightweight metal is aluminum.

15. The illumination device of claim 1, wherein the bracket is composed of plastic.

16. An illumination device, comprising, in combination:

a safety marker having a body, a base and a bottom surface including at least two downwardly-protruding feet;

a bracket of unitary construction and having a ring generally hollow and circular in shape;

said bracket further including at least one flange shaped to fit between the at least two downwardly-protruding feet of the safety marker such that the bracket can be removably attached to the bottom surface of the safety marker;

the at least one flange of the bracket located below the surface of the ring such that the ring is elevated with respect to the flange when the illumination device is attached to the safety marker; a bulb associated with said circular ring of said bracket;

said bulb capable of illuminating the body of said safety marker when said bracket is removably attached to said safety marker; and a power source connected to the bulb.

17. The illumination device of claim 16, wherein the safety marker is composed of a translucent material.

18. The illumination device of claim 16, wherein the bracket is composed of a lightweight material.

19. The illumination device of claim 18, wherein the lightweight metal is aluminum.

* * * * *